United States Patent [19]

Stevenson et al.

[11] 4,424,551

[45] Jan. 3, 1984

[54] HIGHLY-RELIABLE FEED THROUGH/FILTER CAPACITOR AND METHOD FOR MAKING SAME

[75] Inventors: Robert A. Stevenson, Canyon Country; Albert W. Dey, Burbank, both of Calif.

[73] Assignee: U.S. Capacitor Corporation, Sun Valley, Calif.

[21] Appl. No.: 342,497

[22] Filed: Jan. 25, 1982

[51] Int. Cl.³ .......................... H01G 4/42; H01G 4/22
[52] U.S. Cl. .................................... 361/302; 29/25.42
[58] Field of Search ................. 29/25.42; 361/302, 307

[56] References Cited

U.S. PATENT DOCUMENTS

| | | | |
|---|---|---|---|
| 3,266,121 | 8/1966 | Rayburn | 29/25.42 |
| 3,538,464 | 11/1970 | Walsh | 361/302 X |
| 4,041,587 | 8/1977 | Kraus | 29/25.42 |
| 4,148,003 | 4/1979 | Colburn et al. | 361/302 X |
| 4,314,213 | 2/1982 | Wakino | 361/307 X |

FOREIGN PATENT DOCUMENTS 2815118 10/1978 Fed. Rep. of Germany ...... 361/302

*Primary Examiner*—Donald A. Griffin
*Attorney, Agent, or Firm*—Christie, Parker & Hale

[57] ABSTRACT

A method of making a capacitor from a canister having first and second mutually insulated electrically conductive interior surfaces, an open end, and an insulative end surface opposite the open end, and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate. The first step of the method is to place the capacitive structure in the canister so the first bus lies adjacent to the first surface of the canister to define therewith and the closed end surface of the canister a first cavity in communication with the open end of the canister and so the second bus lies adjacent to the second surface of the canister to define therewith and the closed end surface of the canister a second cavity in communication with the open end of the canister. The first and second cavities are out of direct communication with each other. The second step is to introduce into the open end of the canister an electrically conductive solidifiable fluidic connecting material. The connecting material is a thermoset loaded with electrically conductive particles having higher density than the thermoset. The third set is to rotate the canister about a center of rotation toward which its open end faces to induce by centrifugal force flow of the fluidic connecting material into the first and second cavities. The final step is to cure the connecting material. The centrifugal force resulting from rotation of the canister overcomes the surface tension of the connecting material so the connecting material fills the cavities without voids, thereby forming electrical connections of high integrity between the respective conductive surfaces of the canister and the buses of the capacitive structure.

21 Claims, 9 Drawing Figures

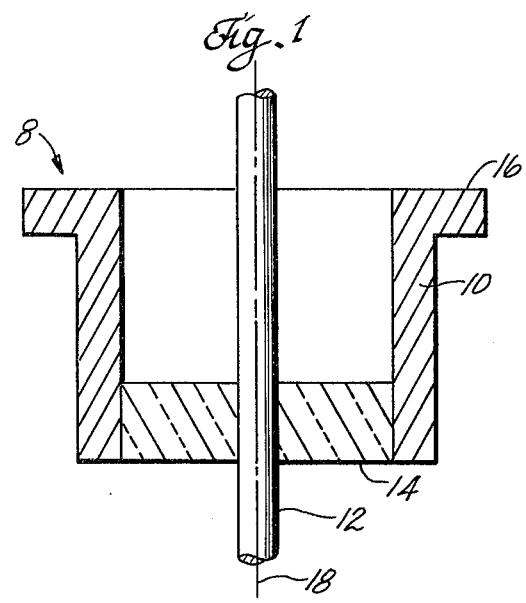
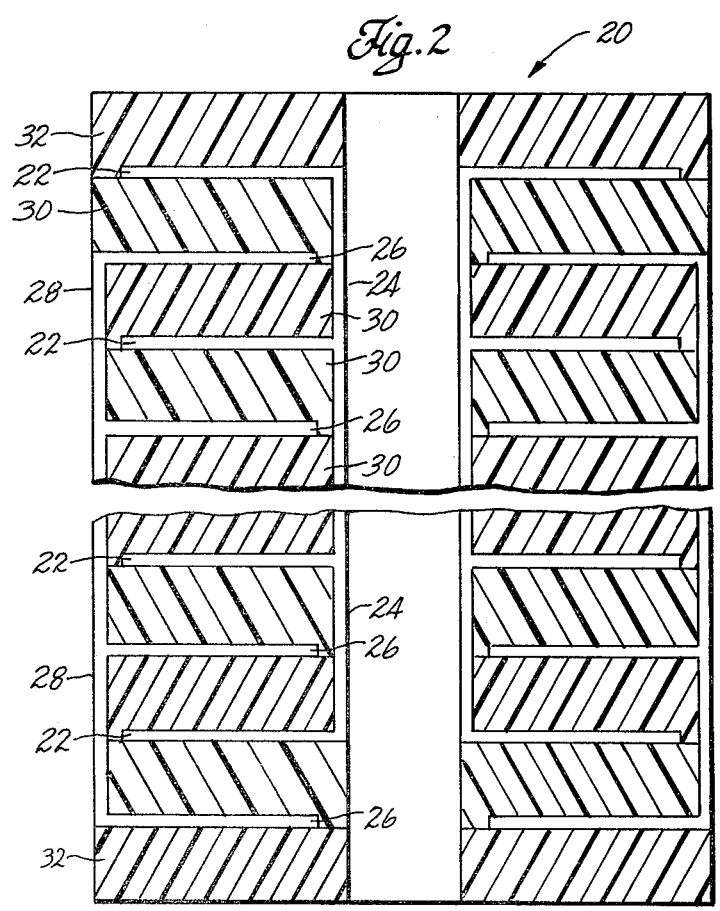

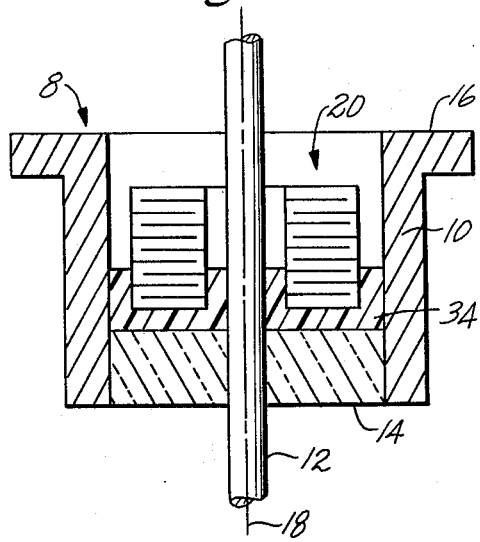
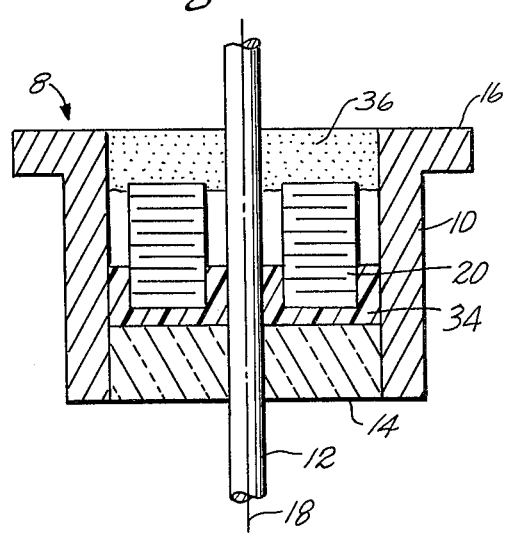
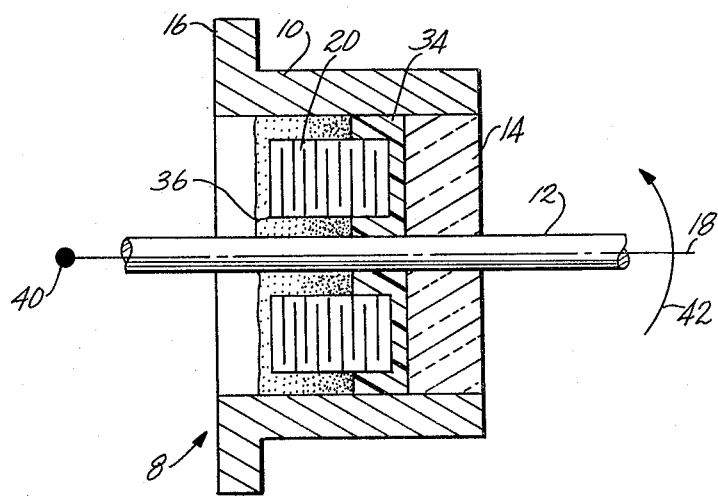

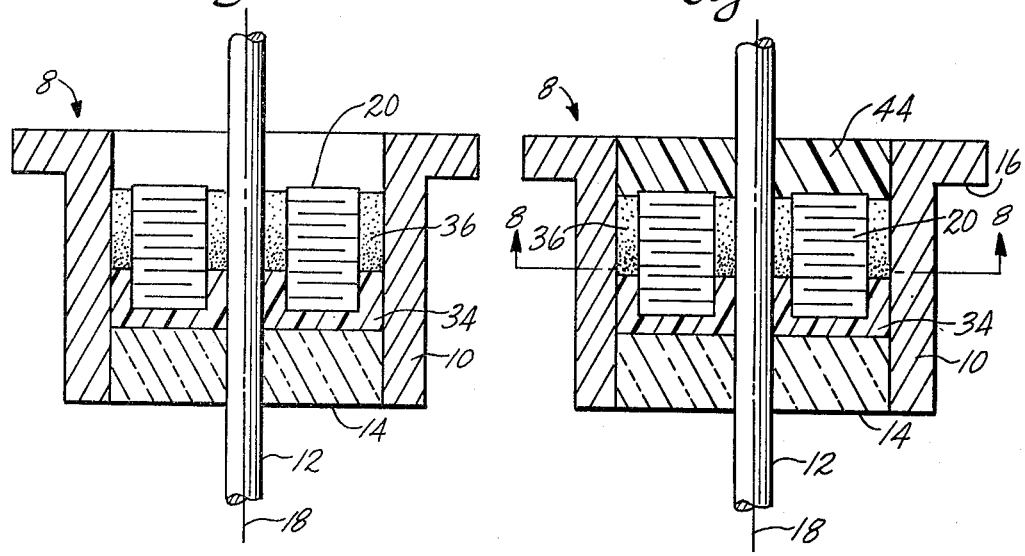

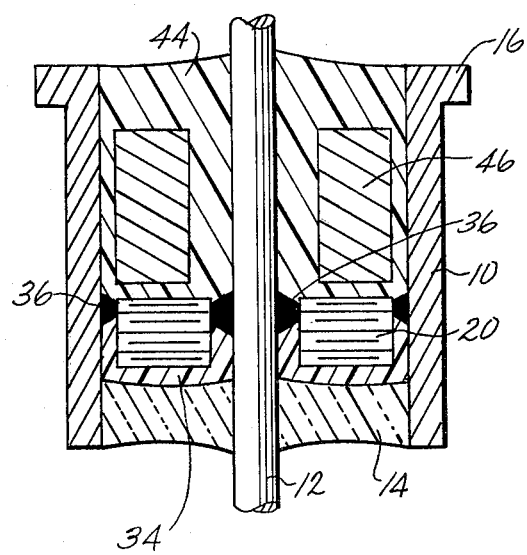

HIGHLY-RELIABLE FEED THROUGH/FILTER CAPACITOR AND METHOD FOR MAKING SAME

BACKGROUND OF THE INVENTION

This invention relates to electrical circuit components and, more particularly, to a highly-reliable feed through/filter capacitor and a method for making such a capacitor.

In applications requiring extremely high reliability, one commonly used form of capacitor comprises a so-called discoidal monolithic capacitive structure disposed in a canister. The capacitive structure has a plurality of pairs of thin spaced apart electrically conductive plates separated by thin layers of ceramic insulation. A first electrically conductive bus connects one plate of each pair together to the exclusion of the other plate of each pair and a second electrically conductive bus connects the other plate of each pair together to the exclusion of the one pair. The canister has first and second mutually insulated electrically conductive interior side surfaces and insulative end surfaces that enclose the capacitive structure such that the first bus lies adjacent to the first surface of the canister in closely spaced relationship therefrom and the second bus lies adjacent to the second surface of the canister in closely spaced relationship therefrom. Mutually isolated solder connections are formed between the first bus and the first surface of the canister and the second bus and the second surface of the canister, respectively.

It has been found that the solder connections severely limit the maximum temperature to which the described capacitor can be exposed without risk of failure. If the temperature of the capacitor becomes sufficiently high to melt the solder during installation of the capacitor on a circuit board or during use of the capacitor, there is a danger that in reforming the solder will bridge the gap between the first and second surfaces of the canister, thereby short circuiting the capacitor, or that the residual flux remaining in the solder connection will be released, thereby degrading the insulation resistance or creating a short circuit. To insure that the capacitor does not become short circuited or open circuited in this manner, it is necessary to maintain its temperature below the melting point of suitable soldering alloys, which is about 200° C. or less. It is also necessary to limit the size of the described capacitor to avoid these problems.

The described capacitor is also sensitive to thermal and vibrational shock. The ceramic insulators in the capacitive structure are particularly susceptible to cracking due to rapid temperature and force change.

SUMMARY OF THE INVENTION

According to the invention, a solderless electrical connection is made in the described capacitor between the respective electrically conductive surfaces of the canister and the buses of the capacitive structure disposed in the canister. As a result, capacitors having a higher temperature rating for installation and operation and larger capacitors can be fabricated.

One aspect of the invention is a method of making a capacitor from a canister in which a capacitive structure is disposed. The canister has first and second mutually insulated electrically conductive interior surfaces, an open end, and an insulative end surface opposite the open end. The capacitive structure has a plurality of pairs of spaced apart electrically conductive plates, a first electrically conductive bus connecting one plate of each pair, together to the exclusion of the other plate of each pair and a second electrically conductive bus connecting the other plate of each pair together to the exclusion of the one plate. The first step of the method is to place the capacitive structure in the canister so the first bus lies adjacent to the first surface of the canister to define therewith and the closed end surface of the canister a first cavity in communication with the open end of the canister and so the second bus lies adjacent to the second surface of the canister to define therewith and the closed end surface of the canister a second cavity in communication with the open end of the canister. The first and second cavities are out of direct communication with each other. The second step is to introduce into the open end of the canister an electrically conductive solidifiable fluidic connection material. The third step is to rotate the canister about a center of rotation toward which its open end faces to induce by centrifugal force flow of the fluidic connecting material into the first and second cavities. The final step is to solidify the connecting material. The centrifugal force resulting from rotation of the canister overcomes the surface tension of the connecting material so the connecting material fills the cavities without appreciable voids, thereby forming electrical connections of high integrity between the respective conductive surfaces of the canister and the buses of the capacitive structure.

A feature of the described method is to introduce into the interior of the canister a volume of connecting material greater than the combined volume of the cavities to insure that sufficient connecting material is available and after the solidifying step to remove the excess connecting material, i.e., that bridging the gap between the conductive surfaces of the canister.

Another aspect of the invention is a method for making a capacitor of the above described type in which the electrical connections between the canister and the capacitive structure are made by injecting into the cavities therebetween uncured thermosetting material loaded with electrically conductive particles and curing the thermosetting material. Thus, the connections do not melt when the capacitor is subjected to high temperatures.

Another aspect of the invention is a method for making a capacitor of the above-described type in which the electrical connections between the canister and the capacitive structure are made by introducing into the cavities therebetween a connecting material comprising a non-conductive, solidifiable fluid and solid conductive particles of higher density insoluably mixed with the fluid and rotating the canister to create by centrifugal force a greater concentration of conductive particles at one end of the cavities than the other. It has been found that the greater concentration of conductive particles at one end of the cavities reduces the overall impedance of the electrical connection, at least at high frequencies.

Another aspect of the invention is a capacitor comprising a canister and a capacitive structure. The canister has first and second mutually insulated electrically conductive interior surfaces. The capacitive structure has a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate. The capacitive structure lies in the canister so the first bus is adjacent to the first surface of the canister to define a first gap therebetween and so the second bus is adjacent to the second surface of the canister to define a second gap therebetween. A first mass of connecting material bridges the first gap, a second mass of connecting material bridges the second gap. Each mass of connecting material comprises a cured thermoset and conductive particles suspended in the thermoset in sufficient concentration to establish an electrical connection between the respective buses and the respective conductive surfaces of the canister. The first and second masses of connecting material are insulated from each other. Preferably, the concentration of conductive particles in the connecting material is greater at one end of the gaps than at the other.

BRIEF DESCRIPTION OF THE DRAWING

The features of a specific embodiment of the best mode contemplated for carrying out the invention are illustrated in the drawings, in which:

FIG. 1 is a side-sectional view of a canister for a capacitor made according to the principles of the invention;

FIG. 2 is a side, partially sectional view of a discoidal monolithic capacitive structure for a capacitor made according to the principles of the invention;

FIG. 3 is a side-sectional view of the capacitive structure of FIG. 2 disposed in the canister of FIG. 1;

FIG. 4 is a side-sectional view of the capacitive structure and canister of FIG. 3 into which a connecting material has been introduced;

FIG. 5 is a side-sectional view of the capacitive structure, canister, and connecting material of FIG. 4 during rotation;

FIG. 6 is a side-sectional view of the capacitive structure, canister, and connecting material of FIG. 4 after rotation has been completed;

FIGS. 7 and 8 are side-sectional and bottom-sectional views, respectively, of a finished capacitor made in accordance with the principles of the invention; and FIG. 9 is a side-sectional view of a version of a finished capacitor made in accordance with the principles of the invention and incorporating an inductive ring.

DETAILED DESCRIPTION OF THE SPECIFIC EMBODIMENTS

In FIG. 1 is shown a capacitor canister 8 comprising an electrically conductive cylindrical tube 10, a solid electrically conductive lead forming cylindrical rod 12 running through the interior of tube 10, and an insulative, annular disc closing one end of tube 10 to form between tube 10 and rod 12 a hermetic seal. A flange 16 is formed at the other end of tube 10. Rod 12 and tube 10 are centered on an axis 18. The inwardly facing cylindrical surface of tube 10 and the outwardly facing cylindrical surface of rod 12 form mutually insulated, electrically conductive interior surfaces in canister 8. The interior face of disc 14 forms an insulative end surface opposite the open end of canister 8. The seal between disc 14 and tube 10 and rod 12 is formed by well-known techniques. The described canister can be purchased on the open market, for example from Aspe, Inc., of Fairfield, N.J. Typically, tube 10 is made from steel plated with gold for improved surface conductivity, rod 12 is made from Kovar coated with gold for improved surface conductivity, and disc 14 is made from clear sealing glass fired to form the seal with tube 10 and rod 12.

In FIG. 2 a discoidal, monolithic capacitive structure 20 comprises in a one-piece laminated construction a plurality of spaced parallel annular conductive layers 22 joined by an outer cylindrical conductive layer 24, a plurality of spaced parallel annular conductive layers 26 joined by an inner cylindrical conductive layer 28, annular insulative layers 30 sandwiched between conductive layers 22 and 26, and annular insulative layers 32 covering the conductive layers (22 or 26) on the ends of structure 20. By way of example, layers 30 and 32 could be a ceramic material such as barium titinate with appropriate additives. Structure 20 is annular in shape, layer 24 covering most of the inside of the annulus, and layer 28 covering most of the outside of the annulus. Layers 22 have an outer diameter slightly smaller than structure 20 so that they do not join layer 28 and layers 26 have an inner diameter slightly larger than structure 20 so that they do not join layer 24. Layers 22 and 26 are disposed adjacent to each other to form parallel pairs of electrically conductive capacitor plates. Layer 24 forms an electrically conductive bus connecting one plate of each pair, namely layers 22, and layer 28 forms an electrically conductive bus connecting the other plate of each pair, namely layers 26, to the exclusion of the one plate of each pair, namely layers 22. Depending upon the physical size of structure 20 and the desired capacitance, layers 22 through 28 are typically of the order of six mils or less in thickness, layers 30 and 32 are of the order of one-half mil or less, and as many as 60 or more of each of layers 22 and 26 are provided. Structure 20 is a commercially available component and its method of construction is well-known in the art. Briefly, a plurality of these structures are generally produced from a single laminate. First, a plurality of thin ceramic films, which comprise the insulative layers, are formed. Next, conductive patterns defining layers 22 and 26 are imprinted on the surfaces of the ceramic films, for example by a silk screening process. Next the insulative layers are stacked to form the laminate. Then, the individual capacitive structures are cut out of the laminate. Finally, layers 24 and 28 are formed on the inner and outer cylindrical surfaces of the structure.

Preparatory to placing capacitive structure 20 into canister 8, an annular bead of a bonding agent 34, such as uncured epoxy, is deposited on the inner surface of disc 14 around rod 12. Structure 20 is then pushed firmly into bonding agent 34 so the bonding agent is squeezed into the gaps between structure 20 and canister 8, as depicted in FIG. 3. Bonding agent 34 extends a maximum of one-third the length of structure 20 along axis 18. Bonding agent 34 is permitted to set up to secure structure 20 within canister 8 in the manner depicted in FIG. 3.

Typically, bonding agent 34 could comprise a two-component epoxy resin, such as MERECO 4583 with hardener #16 which is sold by Mereco Products, Cranston, R.I. In this case, the bonding agent would be set up by curing in an oven for approximately 30 minutes at approximately 150° C. The inner diameter of structure 20 is larger than the diameter of rod 12 and the outer diameter of structure 20 is smaller than the diameter of the inside surface of tube 10. Thus, the respective buses of structure 20 lie adjacent to the respective conductive surfaces of canister 8 in closely spaced relationship to define therewith and the closed end surface of canister 8 two annular cavities in communication with the open end of the canister, but out of direct communication with each other. The prior art teaches use of solder to make the electrical connection between the buses of the capacitive structure and the conductive surfaces of the canister.

According to the invention, a solderless electrical connection is made between the buses of the capative structure and the respective conductive surfaces of the canister in which the capacitive structure is disposed. An electrically conductive solidifiable fluidic connecting material 36 having a pasty consistency is introduced into the open end of canister 8 as depicted in FIG. 4. The volume of conductive material 36 introduced into the interior of canister 8 exceeds the combined volume of the annular cavities to insure that the quantity of conductive material is sufficient to completely bridge the gaps between the buses of capacitive structure 20 and the conductive surfaces of cansistor 8. Preferably, conducting material 36 is an uncured thermosetting, non-conducting material loaded with electrically conductive particles and the conductive particles have a higher density than the thermosetting material. The concentration of conductive particles is sufficient to establish an electrical connection, i.e., a volume resistivity of less than about 0.0005 ohm-cm. Suitable for use as connecting material 36 is an electrically conductive polyimide sold by Ablestik Laboratories of Gardena, Calif., under the designation ABLEBOND 71-1, which has the following typical properties:

| Consistency | Very soft, smooth paste |
| --- | --- |
| Conductor | Pure Silver Particles |
| Specific Gravity | 2.4 grams/ml |
| Work Life (open time) | 8 hours @ RT (25° C.) |
| Cure | 10 min. @ 150° and 10 min. @ 275° C. |
| Hardness (Shore D) | 82 |
| Volume Resistivity | 0.0001 ohm-cm |
| Lap Shear Strength to gold | 1000 psi |
| Surface Temperature | 350° C. (continuous) |
| Maximum Temperature | 500° C. (intermittent) |
| Thermal Conductivity | 1.2 BTU/hr-sq ft-deg F/ft or 0.021 Watts/sq cm-deg C/cm |

Preferably, the ABLEBOND is injected into canister 8 by means of a microsyringe so that a thick layer of the paste covers the portions of the annular cavities visible to the human eye from the open end of canister 8. The viscosity of the pasty connecting material is too high to flow sufficiently into the annular cavities to establish good electrical connections between capacitive structure 20 and canister 8.

The capacitor at the state of completion described in connection with FIG. 4, is mounted in a centrifuge so the open end of canister 8 faces the center of rotation of the centrifuge which is designated 40 in FIG. 5. Preferably, axis 18 of cansister 8 passes through center of rotation 40. When the capacitor is rotated, as represented by an arrow 42, the centrifugal force induces the flow of conductive material 36 into the annular cavities, thereby filling the annular cavities with the conductive material and tending to eliminate most voids within the annular cavities. The excess of conductive material 36 bridges the gap between the annular cavities at the open end of canister, as depicted in FIG. 5. Because of the greater specific gravity of the conductive particles, a greater centrifugal force is exerted on them than on the thermosetting material. As a result, the concentration of conductive particles is greater at the closed end of canister 8 than at the open end thereof, as depicted by the stipling in FIG. 5.

Although centrifuging is the preferable way to inject conductive material 36 into the annular cavities because it facilitates manufacture of the described capacitor in production quantities, other ways of injection may be employed. For example, if the annular cavities are large enough relative to the microsyringe, conductive material 36 may be directly injected into its final position by means of the microsyringe. Alternatively, flow of conductive material 36 into the annular cavities may be induced by hammer blows struck against canister 8 parallel to axis 18 in the direction of desired flow. Other means of applying impact to canister 8 could also be employed to induce flow into the annular cavities. In the case of very large capacitors, the gaps between the conductors of the canister may be sufficiently large so that the conductive material will flow into its proper position with little or no outside influence.

After centrifuging, connecting material 36 is partially or completely cured. In the case of ABLEBOND 71-1, it is partially cured by placing the capacitor in an oven for a minimum of four hours at a temperature of approximately 60° C. and then placing it in an oven for ten minutes at approximately 150° C. Thereafter, the portion of connecting material 36 bridging the gap between the conductive surfaces of canister 8 at its open end is removed, preferably by microblasting. Sufficient connecting material is removed so the end of capacitive structure 20 facing the open end of canister 8 is devoid of the conductive material so no short circuit can develop. Typically, the conductive material could be microblasted by micron-sized sodium bicarbonate in a dry nitrogen carrier gas by means of a Conco Microblaster MB-100 at a pressure setting of 80 to 100 psi. A high velocity stream of finely ground sodium bicarbonate is directed with a microtip into the canister until the end of capacitive structure 20 facing the open end of canister 8 is clean. Sodium bicarbonate is used for the microblasting operation because it is harder than the conductive material, but softer than the gold plate on canister 8 so as to prevent removal thereof. Instead of sodium bicarbonate, other particulate abrasive material having a hardness between that of the conductive material and the gold plate could be employed for the microblasting operation. If connecting material 36 was previously only partially cured, the curing process is now completed. In the case of ABLEBOND 71-1, the capacitor is placed in an oven for 10 to 12 minutes at a temperature of approximately 275° C.

Finally, a potting material 44 is introduced into the open end of canister 8 to fill the remaining space therein and is hardened to complete the capacitor manufacturing method. Typically, potting material 44 could comprise the two-component epoxy system described above as bonding agent 34. The finished capacitor is shown in FIGS. 7 and 8.

In addition to serving to secure structure 20 in place, bonding agent 34 and potting material 44 prevent migration of the conductive particles of connecting material 34 out of the annular cavities during use of the capacitor, which would create danger of either a low insulation resistance condition or a short circuit.

The described capacitor provides a reliable, highly heat resistant electrically conductive connection between capacitive structure 20 and the conductive surfaces of canister 8; further the size and thermal mass restrictions heretofore imposed by the danger of solder reflow during component installation have been removed.

The higher the density of conductive particles in the connecting material, the more viscous and difficult to use is the connecting material. By means of centrifugal force, the density of conductive particles is selectively increased, thereby increasing at least the high frequency admittance of the connection, without adversely affecting the viscosity of the connecting material.

Typical properties and dimensions for the described capacitor are as follows:

| | |
|---|---|
| Max. Installation Temperature | 300° C. |
| Max. Operating Temperature | 200° C. |
| Capacitance | 10,000 picofarads |
| | (range is 1 pf to 2 mfd) |
| Number of layers 22,26 | 6 each |
| Thickness of layers 22,26 | .1 to .3 mils |
| Number of layers 30 | 11 |
| Thickness of layers 30 | 1.6 mils |
| Number of layers 32 | 5 |
| Thickness of layers 32 | 1.6 mils |
| Inside diameter of structure 20 | .040 inch |
| Outer diameter of structure 20 | .127 inch |
| Height of structure 20 | .035 inch |
| Diameter of rod 12 | .032 inch |
| Inside diameter of tube 10 | .140 inch |
| | (range is .06 to .750 inch) |
| Thickness of tube 10 | .0125 inch |
| Height of tube 10 | .150 inch |
| Thickness of disc 14 | .045 inch |

In FIG. 9 is shown a version of a finished capacitor incorporating an inductive ring to form with capacitive structure 20 a filter. Like elements in FIG. 9 bear the same reference numerals as in FIGS. 1 through 8. The filter of FIG. 9 is made in the manner described in connection with FIGS. 1 through 8, except that inductive ring 46 is embedded in potting material 44 before it is hardened. Potting material 44 insulates inductive ring 46, which is preferably made of a ferrite, from structure 20 and canister 8.

The described embodiments of the invention are only considered to be preferred and illustrative of the inventive concept; the scope of the invention is not to be restricted to such embodiment. Various and numerous other arrangements may be devised by one skilled in the art without departing from the spirit and scope of this invention. For example, although a thermosetting plastic loaded with conductive particles is the preferred connecting material, the centrifuging step may be applicable to improve the admittance of an electrical connection for other types of electrically conductive solidifiable fluidic connecting materials. Furthermore, although the centrifuging step is necessary to obtain a good electrical connection with currently known and available types of connecting material because of their high viscosity, if suitable connecting materials with lower viscosity and sufficient conductivity become available in the future, the centrifuging step may be eliminated.

What is claimed is:

1. A method for making a capacitor from a canister having first and second mutually insulated electrically conductive interior surfaces, an open end, and an insulative closed end surface opposite the open end and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate of each pair, the method comprising, in the order recited, the steps of:

placing the capacitive structure in the canister so the first bus lies adjacent to the first surface of the canister to define therewith and the closed end surface of the canister a first cavity in communication with the open end of the canister and so the second bus lies adjacent to the second surface of the canister to define therewith and the closed end surface of the canister a second cavity in communication with the open end of the canister, the first and second cavities being out of direct communication with each other;

introducing into the open end of the canister an electrically conductive solidifiable fluidic connecting material;

rotating the canister about a center of rotation toward which its open end faces to induce by centrifugal force flow of the fluidic connecting material into the first and second cavities; and solidifying the connecting material.

2. The method of claim 1, in which the connecting material is heat curable and the solidifying step comprises heating the connecting material to cure same.

3. The method of claim 2, in which the introducing step introduces a volume of connecting material greater than the combined volume of the first and second cavities so that the connecting material bridges the gap between the first and second cavities at the open end of the canister after the rotating step, the method additionally comprising the step of removing the connecting material that bridges the gap between the cavities after the solidifying step.

4. The method of claim 3, in which the conductive surfaces of the canister are harder than the connecting material and the removing step comprises directing particles of an abrasive material against the connecting material, the abrasive material being harder than the connecting material and softer than the conductive surfaces of the canister.

5. The method of claim 4, in which the first surface of the canister is an outwardly facing cylinder centered on an axis, the second surface of the canister is an inwardly facing cylinder concentric with and larger in diameter than the first surface, the first bus is a cylinder concentric with and larger in diameter than the first surface, but smaller in diameter than the second surface, the second bus is a cylinder concentric with and larger in diameter than the second bus but smaller in diameter than the second surface and the first and second cavities are annular and the rotating step rotates the canister such that the axis of the first surface passes through the center of rotation.

6. The method of claim 5, additionally comprising the step of coating the end surface of the canister with a bonding agent before placing the capacitive structure in the canister so as to secure the capacitive structure in the canister before introducing the connecting material thereto.

7. The method of claim 6, additionally comprising the step of covering the open end of the canister with an insulative material after solidifying the connecting material.

8. The method of claim 1, in which the introducing step introduces a volume of connecting material greater than the combined volume of the first and second cavities so that the connecting material bridges the gap between the first and second cavities at the open end of the canister after the rotating step, the method additionally comprising the step of removing the connecting material that bridges the gap between the cavities after the solidifying step.

9. The method of claim 8, in which the removing step removes part of the connecting material in the cavities adjacent to the open end of the canister.

10. The method of claim 1, in which the first surface of the canister is an outwardly facing cylinder centered on an axis, the second surface of the canister is an inwardly facing cylinder concentric with and larger in diameter than the first surface, the first bus is a cylinder concentric with and larger in diameter than the first surface but smaller in diameter than the second surface, the second bus is a cylinder concentric with and larger in diameter than the second bus, and the first and second cavities are annular and the rotating step rotates the canister such that the axis of the first surface passes through the center of rotation.

11. The method of claim 1, additionally comprising the step of coating the end surface of the canister with an adhesive before placing the capacitive structure in the canister so as to secure the capacitive structure in the canister before introducing the connecting material thereto.

12. The method of claim 11, in which the canister has an open end and an insulative closed end surface opposite the open end; the first bus, the first surface of the canister and the closed end surface of the canister defining a first cavity in communication with the open end of the canister; the second bus, the second surface of the canister, and the closed end surface of the canister defining a second cavity in communication with the open end of the canister; the first and second cavities being out of direct communication with each other; the electrically conductive particles have a higher density than the thermosetting material; and the injecting step comprises the steps of:
  introducing into the open end of the canister the thermosetting material loaded with conductive particles; and
  rotating the canister about a center of rotation toward which its open end faces to induce by centrifugal force flow of the thermosetting material into the first and second cavities with greater concentration of conductive particles farther from the center of rotation.

13. The method of claim 1, additionally comprising the step of covering the open end of the canister with an insulative material after solidifying the connecting material.

14. A method for making a capacitor from a canister having first and second mutually insulated electrically conductive interior surfaces and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate, the method comprising the steps of:
  placing the capacitive structure in the canister so the first bus lies adjacent to the first surface of the canister to define a first gap therebetween and the second bus lies adjacent to the second surface of the canister to define a second gap therebetween;
  injecting into the first and second gaps uncured thermosetting material loaded with electrically conductive particles; and
  curing the thermosetting material.

15. A method for making a capacitor from a canister having first and second mutually insulated electrically conductive interior surfaces, an open end, and an insulative closed end surface opposite the open end, and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate of each pair, the method comprising in the order recited the steps of:
  placing the capacitive structure in the canister so the first bus lies adjacent to the first surface of the canister to define therewith and the closed end surface of the canister a first cavity in communication with the open end of the canister so the second bus lies adjacent to the second surface of the canister to define therewith and the closed end surface of the canister a second cavity in communication with the open end of the canister, the first and second cavities being out of direct communication with each other;
  introducing into the open end of the canister a connecting material comprising a non-conductive solidifiable fluid and solid conductive particles of higher density insolubly mixed with the fluid;
  rotating the canister about a center of rotation toward which its open end faces to induce by centrifugal force flow of the fluidic connecting material into the first and second cavities; and
  solidifying the connecting material.

16. A capacitor comprising:
  a canister having first and second mutually insulated electrically conductive interior surfaces;
  a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate, the capacitive structure lying in the canister to define a first gap therebetween and so the second bus is adjacent to the second surface of the canister to define a second gap therebetween;
  a first mass of connecting material bridging the first gap, the first mass comprising a cured thermoset and conductive particles suspended in the thermoset in sufficient concentration to establish an electrical connection between the first bus and the first surface; and
  a second mass of connecting material bridging the second gap, the second mass comprising a cured thermoset and conductive particles suspended in the thermoset in sufficient concentration to establish an electrical connection between the second bus and the second surface, the first and second masses being insulated from each other, at least one mass having an uneven concentration of conductive particles in the connecting material.

17. The capacitor of claim 16, in which the first surface of the canister is an outward facing cylinder disposed on an axis, the second surface of the canister is an inward facing cylinder concentric with and larger in diameter than the first surface, the first bus has an inward facing cylindrical surface concentric with and larger in diameter than the first surface but smaller in diameter than the second surface, the second bus has an outward facing cylindrical surface concentric with and larger in diameter than the second bus but smaller in diameter than the second surface, the first and second gaps form annular cavities and the concentration of conductive particles in the connecting material is greater at one end of the first and second gaps than at the other.

18. The capacitor of claim 17, in which the canister comprises a tube, forming the second surface, a rod through the tube forming the first surface, a first mass of insulative material covering one end of the tube and the capacitive structure, and a second mass of material covering the other end of the tube and the capacitive structure.

19. The capacitor of claim 18, additionally comprising an annular inductor disposed around the rod in the first mass of insulative material.

20. The capacitor of claim 16, in which the conductive surfaces of the canister are harder than the first and second masses of connecting material.

21. The capacitor of claim 16, in which the canister has a first mass of insulative material adjacent to one end of the capacitive structure, a second mass of insulative material adjacent to the other end of the capacitive structure, and an inductor embedded in one of the masses of insulative material.

* * * * *

UNITED STATES PATENT OFFICE
CERTIFICATE OF CORRECTION

PATENT NO. : B1 4,424,551
DATED : June 11, 1991
INVENTOR(S) : Robert A. Stevenson and Albert W. Dey It is certified that error appears in the above-identified patent and that said Letters Patent is hereby corrected as shown below:

Col. 1, Claim 14, Line 11, "capacitance"

should be -- capacitive --.

Signed and Sealed this

Twenty-seventh Day of October, 1992

Attest:

DOUGLAS B. COMER

*Attesting Officer*   *Acting Commissioner of Patents and Trademarks*

REEXAMINATION CERTIFICATE (1489th)

United States Patent [19]
Stevenson et al.

[11] B1 4,424,551
[45] Certificate Issued Jun. 11, 1991

[54] HIGHLY-RELIABLE FEED THROUGH/FILTER CAPACITOR AND METHOD FOR MAKING SAME

[75] Inventors: Robert A. Stevenson, Canyon Country; Albert W. Dey, Burbank, both of Calif.

[73] Assignee: AVX Corporation, New York, N.Y.

Reexamination Request:
No. 90/001,983, Apr. 3, 1990

Reexamination Certificate for:
Patent No.: 4,424,551
Issued: Jan. 3, 1984
Appl. No.: 342,497
Filed: Jan. 25, 1982

[51] Int. Cl.$^5$ .................... H01G 4/42; H01G 4/22
[52] U.S. Cl. .................................... 361/302; 29/25.42
[58] Field of Search .................... 29/25.42, 25.35; 333/181–183; 174/152 GM; 361/306, 307, 302

[56] References Cited

U.S. PATENT DOCUMENTS

| | | | |
|---|---|---|---|
| 2,774,747 | 12/1956 | Wolfson et al. | 260/32.8 |
| 2,866,057 | 12/1958 | Peck | 201/63 |
| 3,157,473 | 11/1964 | Acton | 29/183.5 |
| 3,256,471 | 6/1966 | Cowles | 361/307 |
| 3,266,121 | 8/1966 | Rayburn | 29/25.42 |
| 3,346,689 | 10/1967 | Parstorfer | 174/68.5 |
| 3,538,464 | 11/1970 | Walsh | 333/79 |
| 4,041,587 | 8/1977 | Kraus | 29/25.42 |
| 4,148,003 | 4/1979 | Colburn et al. | 333/181 |
| 4,152,540 | 5/1979 | Duncan | 174/152 GM |
| 4,263,702 | 4/1981 | Vig et al. | 29/25.35 |
| 4,314,213 | 2/1982 | Wakino | 333/182 |

FOREIGN PATENT DOCUMENTS

2815118 10/1978 Fed. Rep. of Germany .

OTHER PUBLICATIONS

R. L. Filler, et al, Polyimide Bonded Adhesives, Proceedings of the 32nd Annual Symposium on Frequency Control, Atlantic City, New Jersey, May 21–Jun. 2, 1978, pp. 290–298.
Abelbond 71-1, High Temperature, Electrically Conductive Polimide Chip Adhesive, Ablestik Laboratories, Gardena, Calif. (Product Data Sheet).
New Silver Epoxy Speeds Electronic Production, Adhesives Age, Jun. 1974, p. 35.

*Primary Examiner*—Donald A. Griffin

[57] ABSTRACT

A method of making a capacitor from a canister having first and second mutually insulated electrically conductive interior surfaces, an open end, and an insulative end surface opposite the open end, and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate. The first step of the method is to place the capacitive structure in the canister so the first bus lies adjacent to the first surface of the canister to define therewith and the closed end surface of the canister a first cavity in communication with the open end of the canister and so the second bus lies adjacent to the second surface of the canister to define therewith and the closed end surface of the canister a second cavity in communication with the open end of the canister. The first and second cavities are out of direct communication with each other. The second step is to introduce into the open end of the canister an electrically conductive solidified fluidic connecting material. The connecting material is a thermoset loaded with electrically conductive particles having higher density than the thermoset. The third set is to rotate the canister about a center of rotation toward which its open end faces to induce by centrifugal force flow of the fluidic connecting material into the first and second cavities. The final step is to cure the connecting material. The centrifugal force resulting from rotation of the canister overcomes the surface tension of the connecting material so the connecting material fills the cavities without voids, thereby forming electrical connections of high integrity between the respective conductive surfaces of the canister and the buses of the capacitive structure.

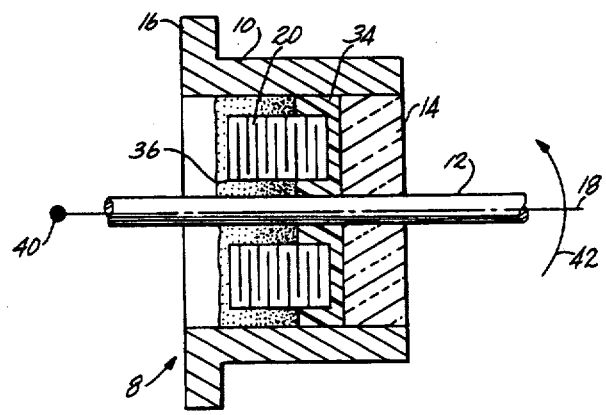

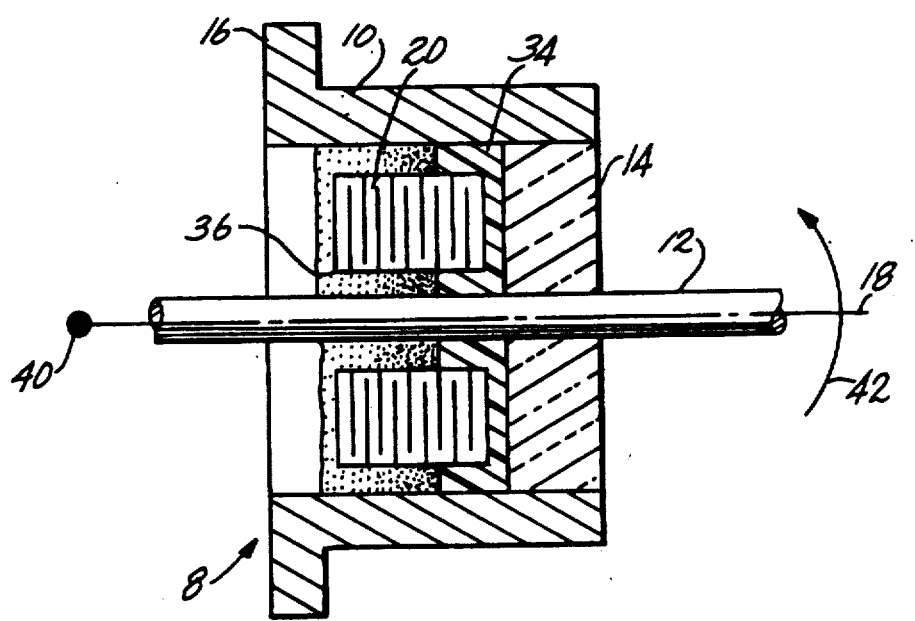

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-13 and 15-21 is confirmed.

Claim 14 is determined to be patentable as amended.

New claims 22 and 23 are added and determined to be patentable.

14. A method for making a capacitor from a canister having first and second mutually insulated electrically conductive interior surfaces and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate, the method comprising the steps of:
   placing the capacitance structure in the canister so the first bus lies adjacent to the first surface of the canister to define a first gap therebetween and the second bus lies adjacent to the second surface of the canister to define a second gap therebetween;
   injecting into the first and second gaps uncured thermosetting material loaded with electrically conductive particles; and
   curing the thermosetting material *to form an electrical connection between the buses of the capacitive structure and the respective conductive surfaces of the canister in which the capacitive structure is disposed.*

22. *A method for making a capacitor from a canister having first and second mutually insulated electrically conductive interior surfaces, an open end and an insulative closed end surface opposite the open end and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate, the method comprising the steps of:*
   *coating the closed end surface of the canister with a bonding agent before placing the capacitive structure in the canister;*
   *placing the capacitive structure in the canister so the first bus lies adjacent to the first surface of the canister to define a first gap therebetween and the second bus lies adjacent to the second surface of the canister to define a second gap therebetween;*
   *injecting into the first and second gaps uncured thermosetting material loaded with electrically conductive particles;*
   *curing the thermosetting material; and*
   *introducing a potting material into the open end of the canister to fill the remaining space therein.*

23. *A method for making a capacitor from a canister having first and second mutually insulated electrically conductive interior surfaces, an open end and an insulative closed end surface opposite the open end and from a capacitive structure having a plurality of pairs of spaced apart electrically conductive plates, a first electrically conductive bus connecting one plate of each pair together to the exclusion of the other plate of each pair, and a second electrically conductive bus connecting the other plate of each pair together to the exclusion of the one plate, the method comprising the steps of:*
   *placing on the closed end surface of the canister a quantity of uncured bonding agent;*
   *placing the capacitive structure in the canister so the first bus lies adjacent to the first surface of the canister to define a first gap therebetween and the second bus lies adjacent to the second surface of the canister to define a second gap therebetween;*
   *pushing an end of said structure into said uncured bonding agent to thereby squeeze increments of said uncured bonding agent into said gaps to partially fill said gaps and thereby seal the ends of said gaps adjacent said closed end surface;*
   *injecting into the first and second gaps uncured thermosetting material loaded with electrically conductive particles;*
   *curing the thermosetting material; and*
   *introducing a potting material into the open end of the canister to seal said canister.*

* * * * *